(No Model.)

J. PHILLIPPE.
GATE.

No. 316,652. Patented Apr. 28, 1885.

WITNESSES.
Jacob W. Loeper
Josh. E. Flora

INVENTOR.
Josiah Phillippe
By C. P. Jacobs
Atty.

UNITED STATES PATENT OFFICE.

JOSIAH PHILLIPPE, OF BICKNELL, INDIANA.

GATE.

SPECIFICATION forming part of Letters Patent No. 316,652, dated April 28, 1885.

Application filed May 23, 1884. (No model.)

*To all whom it may concern:*

Be it known that I, JOSIAH PHILLIPPE, a resident of Bicknell, Indiana, have made certain new and useful Improvements in Gates, a description of which is set forth in the following specification, reference being made to the accompanying drawings, in the several figures of which like letters indicate like parts.

My invention relates to the construction of gates, especially farm or wagon gates; and the object is to combine strength with lightness and economy of construction, and will be understood from the following description.

Figure 1:
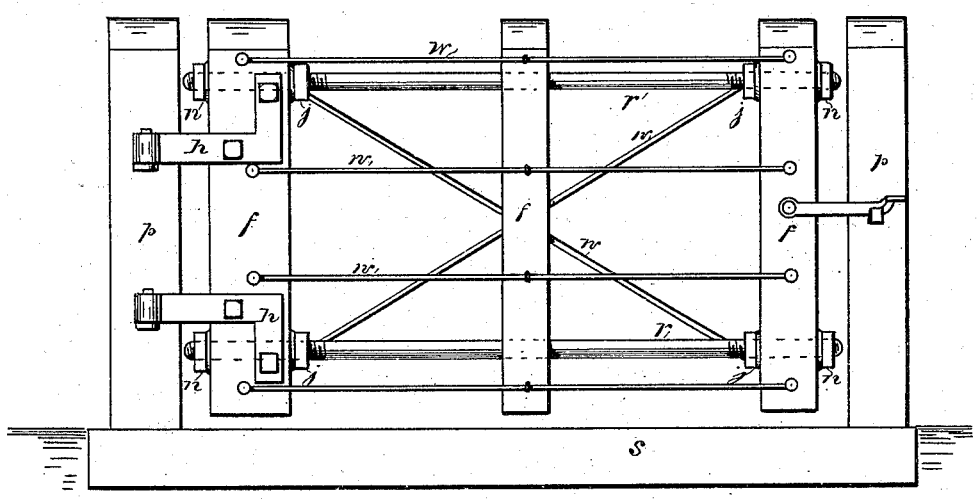
Figure 2:
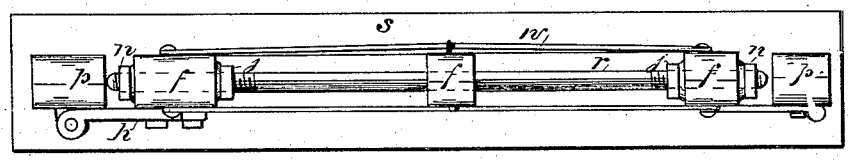

In the drawings, Figure 1 represents a side, and Fig. 2 a top, view of my device.

In detail $s$ represents the sill, and $p\ p$ the posts with which the gate is connected, and which are suitably mortised into the sill. The gate itself is composed of three uprights or frame timbers, $f$, and these are connected at top and bottom by the transverse stay-rods $r$, having tightening-nuts $n$ on the outside and jam-nuts $j$ on the inside of the end pieces, $ff$, these rods $r$ also passing through the middle upright, $f$, as shown in Fig. 1. It is evident that by means of these nuts the end pieces of the gate may be forced out or crowded in whenever from any cause the gate becomes shackly or loose or inclined to sag down at either end.

$w$ are wires which constitute the fence portion of the gate, and may be either barbed or smooth, and are stretched across, connecting the end and middle pieces of the gate parallel with the stay-rods $r$, and also diagonally from corner to corner, and may be tightened up after they have been secured in position by means of any suitable stretching device.

$h$ are hinges of wrought or cast iron, formed in the shape of an L, as shown, the two parts being at right angles to each other. When constructed in this way, they are not only adapted to sustain a heavy weight, but assist in bracing the rear portion of the gate. The wires may be stretched on one or both sides of the gate either diagonally or horizontally, or both, and a central stay-rod may be added, if desired.

Instead of the stay-wires, boards may be used for connecting the uprights of the gate, if desired, and with a similar result. The stay-wires, when crossed diagonally, are nailed to the ends of the uprights of the gate, but are not fastened to the stay-rods $r$.

I am aware that gates have been constructed in which stay-rods and stay-wires have been used in connection with intermediate diagonal or perpendicular braces, and do not claim the same, broadly, as my invention.

What I do claim, however, and desire to secure by Letters Patent, is the following:

1. In a gate, a series of uprights, $f$, connected by the transverse stay-rods $r$, whose ends are threaded to receive tightening-nuts $n$ and inner jam-nuts, $j$, in combination with the L-shaped hinges $h$, substantially as described.

2. In a gate, the outer and central uprights, $f$, connected by stay-rods $r$, whose ends are threaded to receive tightening-nuts $n$ and jam-nuts $j$, the fence-wires $w$, connecting the uprights on one or more sides, and the L-shaped hinges $h$, all combined substantially as described.

3. In a gate, the end and central uprights, $f$, connected by stay-rods $r$, whose ends are threaded to receive tightening-nuts $n$ and jam-nuts $j$, the uprights further connected by means of fence-wires or boards on one or both sides of the uprights, the L-shaped hinges $h$, the outer posts, $p$, and sill $s$, all combined substantially as described.

In witness whereof I have hereto set my hand this 8th day of May, 1884.

JOSIAH PHILLIPPE.

Witnesses:
JOSEPH M. FREEMAN, Jr.,
CHARLES RUBY.